(12) United States Patent
Ayabe et al.

(10) Patent No.: US 6,669,272 B2
(45) Date of Patent: Dec. 30, 2003

(54) CABIN OF BACK HOE

(75) Inventors: Hiroaki Ayabe, Osaka (JP); Masami Miyanishi, Osaka (JP); Takaaki Kuroda, Osaka (JP); Masao Nagata, Okayama (JP)

(73) Assignees: Yanmar Co., Ltd., Osaka (JP); Seirei Industry Co., Ltd., Okayama (JP)

( * ) Notice: Subject to any disclaimer, the term of this patent is extended or adjusted under 35 U.S.C. 154(b) by 0 days.

(21) Appl. No.: 10/181,787
(22) PCT Filed: Jan. 18, 2001
(86) PCT No.: PCT/JP01/00319
§ 371 (c)(1),
(2), (4) Date: Sep. 17, 2002
(87) PCT Pub. No.: WO01/53613
PCT Pub. Date: Jul. 26, 2001

(65) Prior Publication Data
US 2003/0047965 A1 Mar. 13, 2003

(30) Foreign Application Priority Data
Jan. 19, 2000 (JP) .......................... 2000-10444

(51) Int. Cl.⁷ .............................. B62D 23/00
(52) U.S. Cl. ............................ 296/190.08; 296/190.11; 180/89.12
(58) Field of Search ....................... 296/190.01, 190.08, 296/190.11, 146.13; 180/89.12; D12/1; 160/199, 206, 213

(56) References Cited

U.S. PATENT DOCUMENTS

| | | | |
|---|---|---|---|
| 2,538,429 A * | 1/1951 | Schantz ...................... 160/206 |
| 3,606,047 A | 9/1971 | Schaeff |
| 3,993,346 A | 11/1976 | Mounts |
| 4,518,195 A | 5/1985 | Tindall et al. |
| 5,076,635 A | 12/1991 | Larkin et al. |
| 5,096,255 A | 3/1992 | Leischner |
| 5,125,716 A * | 6/1992 | Smith et al. ................. 296/201 |
| 5,362,118 A | 11/1994 | Houriez |
| 5,456,305 A * | 10/1995 | Snarli ......................... 160/213 |
| 5,577,795 A * | 11/1996 | Shinsen .................... 180/89.12 |
| 6,149,228 A * | 11/2000 | O'Neill et al. ......... 296/190.03 |
| 6,155,632 A * | 12/2000 | Fujimoto ................ 296/190.08 |
| 6,170,588 B1 * | 1/2001 | Irino et al. ............... 180/89.12 |
| 6,244,369 B1 * | 6/2001 | Yunoue et al. ......... 296/190.08 |
| 6,247,746 B1 * | 6/2001 | Brush ..................... 296/190.11 |
| 6,378,172 B1 * | 4/2002 | Schrage ..................... 160/199 |
| 6,502,896 B1 * | 1/2003 | Nakata et al. ......... 296/190.01 |

FOREIGN PATENT DOCUMENTS

| | | |
|---|---|---|
| DE | 24 38 752 A | 2/1976 |
| DE | 0 012 150 | 6/1980 |
| EP | 0 721 69 36 | 8/1995 |
| EP | 0 743 401 | 11/1996 |
| EP | 0 743 401 A2 | 11/1996 |
| EP | 0 900 39 74 | 1/1997 |

(List continued on next page.)

Primary Examiner—Joseph D. Pape
Assistant Examiner—Greg Blankenship
(74) Attorney, Agent, or Firm—Knobbe, Martens, Olson & Bear LLP

(57) ABSTRACT

A cabin of a rearward small-turn backhoe having a portion of a turn frame (2) excluding a working machine mounting part (1) formed generally in circular shape and formed so that the diameter thereof is stored generally within the width of a traveling device (1), wherein the rear part of the cabin (8) is formed in a curved shape generally along the outer peripheral form of the turn frame (2) as viewed from a horizontal plane, at least a side face of the cabin is formed in a polygonal shape, and two faces of the polygonal shape adjacent to each other are formed in a foldable door (15a, 15b), whereby an indoor space can be increased over a conventional one to improve comfortability, and a controllability can be improved because a lever operation can be performed in a roomy space.

20 Claims, 20 Drawing Sheets

FOREIGN PATENT DOCUMENTS

| | | | |
|---|---|---|---|
| EP | 0 743 401 A3 | 7/1997 | |
| EP | 0 932 87 80 | 12/1997 | |
| EP | 1 110 08 64 | 4/1999 | |
| EP | 1 122 94 39 | 8/1999 | |
| FR | 2 577 483 | 8/1986 | |
| FR | 0 462 007 A1 | 12/1991 | |
| JP | 02040835 * | 3/1990 | ............ 296/190.08 |
| JP | 07 216936 | 8/1995 | |
| JP | 07-216936 | 8/1995 | |
| JP | 09-003974 | 1/1997 | |
| JP | 09-328780 | 12/1997 | |
| JP | 11-100864 | 4/1999 | |
| JP | 11-229439 | 8/1999 | |
| JP | 11-254949 | 9/1999 | |
| JP | 2000-080678 | 3/2000 | |
| JP | 2000-096623 | 4/2000 | |
| WO | WO 80/02676 | 12/1980 | |

* cited by examiner (a)

(b)

CABIN OF BACK HOE

This application is the U.S. National Phase under 35 U.S.C. §371 of International Application PCT/JP01/00319, filed Jan. 18, 2001, which claims priority to Japanese Patent Application No. 2000-10444, filed Jan. 19, 2000. The International Application was published under PCT Article 21(2) in a language other than English.

FIELD OF THE INVENTION

The present invention relates to a construction of a cabin of a backhoe.

BACKGROUND ART

Up to now, there is known to the public a backhoe with a cabin which covers a control portion so as to enable a comfortable work in rainy weather, in a cold district, or in summer.

In this construction, a door for getting in and out the cabin is provided in a side face of the cabin. The door can be opened and closed around the vertical axis on the backside of the door. Alternatively, a sliding door or a foldable door may be used to serve as a door prevented from protruding on its opening.

Moreover, there is also known to the public such an art that the above-mentioned door falls within the width of a traveling device during the turn of a turn frame by placing the door within the turn frame in plan view. For example, such an art is disclosed in the Japanese Utility Model Laid Open Gazette Hei. 6-85455, the Japanese Patent Laid Open Gazette Hei. 11-10084, and the Japanese Patent No. 257541.

An actual work may be done with the door open, when it is not as hot as an air-conditioning is required, or frequent accesses to the cabin are required, etc. From such the actual condition, it is a weak point of the art in the Japanese Utility Model Laid Open Gazette Hei. 6-85455 and the Japanese Patent Laid Open Gazette Hei. 11-10084 that the outer edge of the door protrudes from the turn frame at the time of opening the door, and cross over the width of the traveling device, and there causes possibility of hitting external obstacles with the door at the turn motion.

In the art of Japanese Patent No. 257541, the door is constituted so as to fall within a diameter of turning circle within the width of the traveling device even if the door is open. In the construction, a cabin side wall greatly is bulged to the outside direction perpendicular to the turn direction so as to improve the comfort. However, an operator is forced to operate in the space which is not large enough, because the bulge of the side wall is in the shape of a "dogleg" in plan view and still reduces the space greatly, so the indoor space cannot yet be assured to the maximum. According to the embodiment in a specification of Japanese Patent No. 257541, the operation of the lever (left-hand side lever) located on the side where the side wall is bulged becomes difficult because of contact of an operator's arm to the side wall while operating.

Moreover, when the door of the above-mentioned foldable type is adopted, the door arranged in the circle of the circular turn frame cannot utilize the most of the indoor space because the width of a door on one side in the longitudinal direction (before side) is larger than the width of the other door on the other side in the longitudinal direction (backside).

The present invention is made in view of the weak point of such a conventional constitution, and an object of the present invention is to provide a cabin of a backhoe which is placed substantially within a diameter of turning circle even at the time of opening the door, while assuring the maximum habitation space and operability in the limited turn table.

DISCLOSURE OF THE INVENTION

A cabin of a small-rear-turning backhoe according to the present invention comprises a turn frame, which is substantially circular excluding a portion thereof serving as a working machine mounting part for attaching a working machine and whose diameter substantially falls within the width of a traveling device. A rear portion of the cabin is formed into a curved surface which is disposed substantially along an outer peripheral shape of the turn frame in plan view, and at least one side surface of the cabin is constructed in a polygonal shape. Thereby, an indoor space can be enlarged than before, so comfort is improved, and operability about levers is improved in such a comfortable space. The safety at work is also improved. Furthermore, such a cabin can suit to standards of countries except Japan.

Moreover, according to the present invention, the cabin covers a substantially whole surface of portion of the turn frame excluding the working machine mounting part and one side portion thereof serving as a tank cover. Therefore, the indoor space can be enlarged so as not to disturb the excavating work, whereby a control operation becomes possible without an oppressive sensation even if a backhoe is small, and comfort is improved.

Alternatively, the cabin may cover a substantially whole surface of portion of the turn frame excluding the working machine mounting part. In this construction, the tank cover can be opened from outer side while the indoor space being enlarged, so that controllability and workability are improved without damaging maintenance nature.

Furthermore, according to the present invention, a fuel tank is mounted on the one side of the turn frame, and the cabin is mounted across the fuel tank so that the side surface of the fuel tank serves as a part of side surface of the cabin. Therefore, the portion of the fuel tank under the cabin is omitted so as to reduce the material costs of the cabin while the indoor space of the cabin is enlarged. Such a cabin contributes to improvement in comfort without deteriorating ease in maintenance of the tank.

According to the present invention, the rear portion of the cabin is located on a rear outer peripheral end of an engine room. A bonnet, which covers the cabin, and the engine room are aligned on a substantially straight line, so as to reduce irregularity between the cabin and the bonnet, thereby improving an appearance. Moreover, the cabin is located in inner side of the turn frame so as not to contact other obstacles in turn motion.

Moreover, according to the present invention, the side wall of the cabin is so slanted that the upper portion thereof is disposed inward of turn circle. A head of the cabin does not look large so that the cabin appears stable. Furthermore, the cabin head is prevented from contacting obstacles in its turn motion.

In addition, an outer peripheral end of a roof in the cabin overhangs outward from an outer surface of a window glass. Thus, raindrops etc. do not directly hit a sealing member of the window glass, thereby lengthening a life of the sealing member so as to effectively prevent the rainwater from permeating the indoor for a long time.

Among side surfaces of the cabin arranged in a polygonal shape, adjacent two surfaces are constituted by a foldable door. These adjacent two surfaces have substantially equal widths so as to enlarge the indoor space, thereby improving comfort and controllability of levers.

Additionally, the cabin of the rearward small-turning backhoe according to the present invention comprising the turn frame formed in substantially circular shape excluding the working machine mounting part thereof so that the diameter of the turn frame fall substantially within the width of the traveling device, wherein a foldable door is adopted as the door provided in the cabin, and the center of a pivotal shaft of a hinge at the fold position thereof is located on an extension line serving as middle lines of the respective door glasses in their thickness. Due to this construction, whether the door is opened and closed, the space between the door glasses does not change. Therefore, the tension force or the compressive force hardly interacts on a sealing member at the fold position, so the sealing member can have a long life. The rotation angle range is also assured widely.

According to the present invention, edges of both the door glasses mutually connected by the hinge are also connected by a sealing member. The sealing member is constructed so as to bypass the hinge so that the rotation of the hinge and the expansion and contraction of the sealing member can be performed separately from each other so as to avoid interacting stress therebetween, thereby lengthening a life of the sealing member. Moreover, a core is put into a portion of the seal member for clamping the glass so that the sealing member can be assembled by the merely easy fitting operation without adhesion.

Furthermore, a cabin of a backhoe according to the present invention comprises a cabin frame, wherein an edge portion of the cabin frame to which a glass is attached is provided with holes or bosses. Therefore, even if the glass brakes, a substitute glass made of a synthetic resin etc. which is previously opened by holes corresponding to the holes or bosses of the cabin frame in location, can be easily engaged with the cabin frame through bolts, pins or so on. Hence, the glass can be quickly repaired because the time for drying an adhesive bond is unnecessary, thereby shortening the discontinuation time of work and enabling the work to be resumed in no time.

In addition, the cabin of a backhoe according to the present invention is detachably provided with a front lower glass, wherein a beltlike member, which is wider than the width of the front lower glass so that the removed front lower glass is stored between an inner surface of the cabin and the beltlike member. Therefore, the removed front lower glass can be moved for storage only by being taken down while its upward or sideward motion can be shortened, thereby reducing a fear of braking the front lower glass in its detachment. Moreover, the fixed structure of the front lower glass becomes simple and cheap.

BRIEF DESCRIPTION OF THE DRAWINGS

FIG. 10 shows a first embodiment of a hinged part in the foldable door, wherein FIG. 10(a) is an arrow sectional view of the line A—A in FIG. 9, and FIG. 10(b) is an arrow sectional view of the line B—B in FIG. 9.

PREFERRED EMBODIMENT OF THE INVENTION

Figure 1:
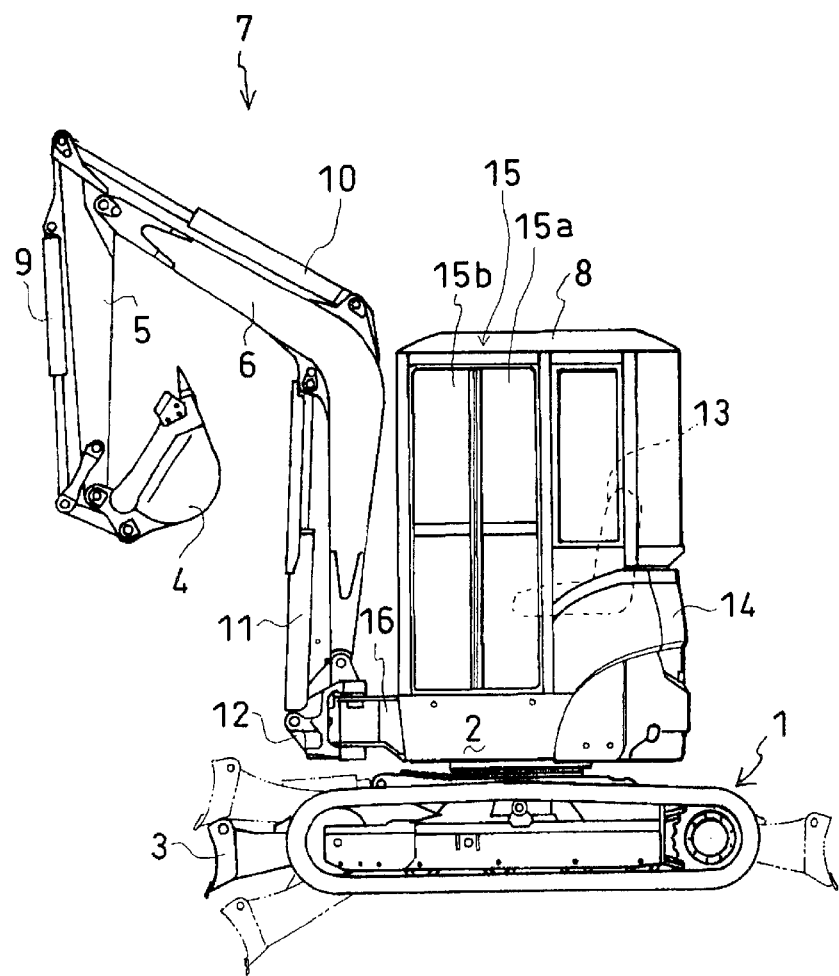
FIG. 1 is a whole side view of a backhoe adopting a cabin according to the present invention.

The present invention will be described in further detail with reference to the accompanying drawings.

In the first place, description will be given of a whole construction of a backhoe shown in FIG. 1, FIG. 2 and FIG. 3.

On the top of a crawler type traveling device 1 equipped with a pair of crawlers (left, right) is rotatably mounted a turn frame (turn table) 2. A rear portion of the turn frame 2 formed into a circular shape in plan view substantially falls within a width of the crawler type traveling device 1. That is, a diameter of the turn frame is substantially smaller than the width of the traveling device 1 (W>R×2 in FIG. 3), thereby constituting a so-called rearward small-turn backhoe.

A soil discharging plate 3 protrudes to the front of the crawler type traveling device 1. An engine and a battery, etc. are disposed on the rear portion of the turn frame 2 and covered by a bonnet so as to constitute an engine room. A fuel tank is mounted on the right side of the turn frame 2 and covered by a tank cover 17. An operator's seat 13 is disposed on the substantially longitudinally middle portion of the turn frame 2. In front of the operator's seat are disposed operating levers, etc. for operating the turning direction or the working machine. The operator's seat 13 and the operating levers, etc. are covered by a cabin 8.

A working machine mounting part 16 is formed on the substantially middle portion of the turn frame 2 in a transversal direction, and has a base of an excavating machine 7 installed thereon. The excavating machine 7 is composed of a bucket 4, an arm 5, a boom 6, and cylinders for rotating them, etc. The base of the boom 6 is longitudinally rotatably supported by a boom bracket 12, which is laterally rotatably supported by the working machine mounting part 16. A boom cylinder 11 is interposed between the boom 6 and the boom bracket 12 for enabling the boom 6 to turn up and down. On the tip of the boom 6 is rotatably installed the arm 5, and an arm cylinder 10 is interposed between the arm 5 and the boom 6 for enabling the arm 5 to turn forward and backward. At the tip of the arm 5 is pivotally supported the bucket 4, and a bucket cylinder 9 is interposed between the arm 5 and the bucket 4 for enabling the bucket 4 to turn for dipping up.

Next, description will be given of the construction of the cabin 8 in accordance with FIG. 1 to FIG. 4. As shown in FIG. 3, the turn frame 2 is in the shape of a circle in plan view, and the circle is cut away in the front portion thereof, in which the working machine mounting part 16 is installed. On the turn frame 2 is mounted the cabin 8 which is constructed in such a way that the outline of the cabin 8 may fall within the outline of the turn frame 2.

Figure 3:
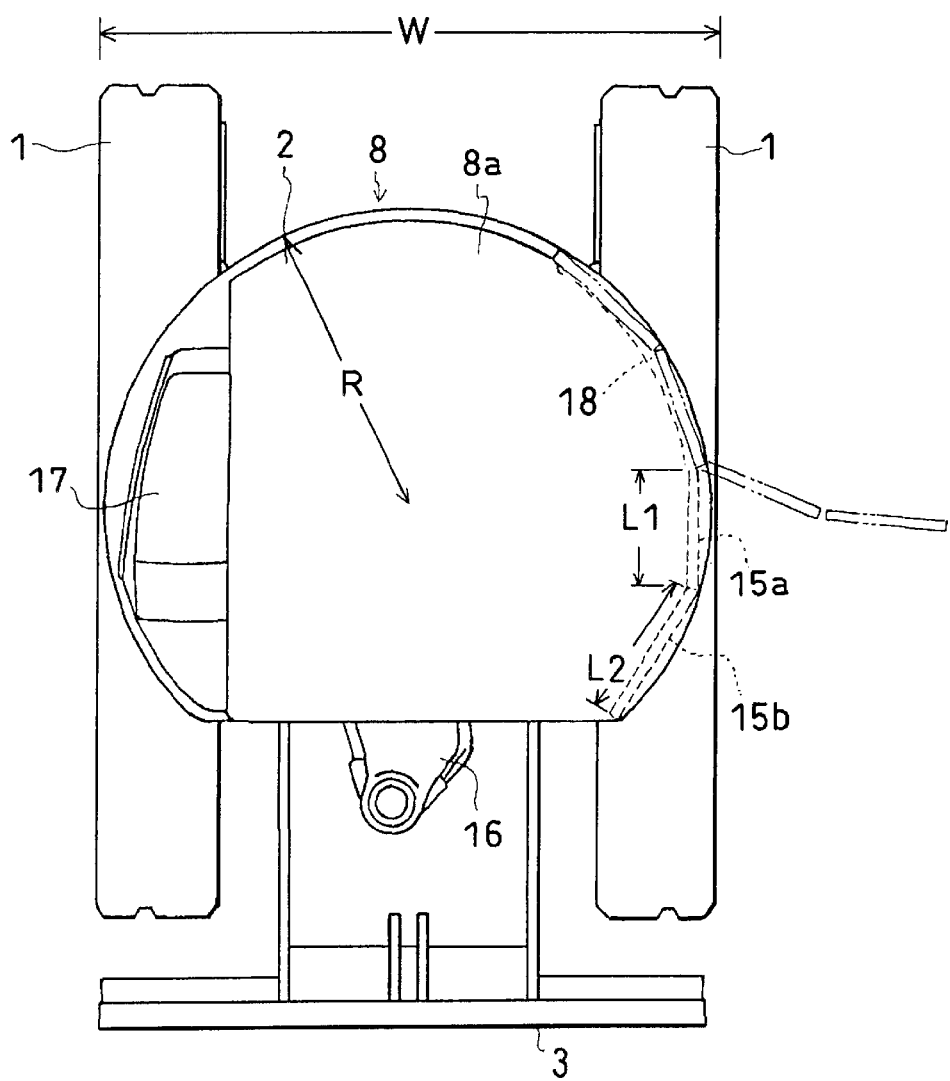
FIG. 3 is a plan view of the above.

As shown in FIG. 3, in the right side (the left side in the figure) of the cabin 8 is exposed a part (about half) of the tank cover 17, and remaining part of the tank cover 17 is disposed so as to be covered by the cabin 8. That is, the right side surface of the cabin 8 is constructed so as to stride over a fuel tank. On the rear portion of the engine room (in other word, on the rear portion of the bonnet 14) is mounted the rear portion of the cabin 8, which is formed into a curved surface shape along the outer peripheral shape of the turn frame 2.

As the above, the right side surface and the front surface of the cabin 8 is constructed in a polygonal shape, while the remaining part of the cabin 8 is constructed in the shape of a curved surface. The outline of the curved surface of the cabin 8 is constructed so that a part of the outline is in the shape of a circle and the remaining part of the outline is in a polygonal shape. However, as shown in FIG. 4, the outline of the cabin 8 excluding the front surface may be in the shape of a circle in plan view so that the cabin 8 may be disposed so as to cover the whole upper surface of the turn frame 2 excluding the working machine mounting part 16.

Figure 2:
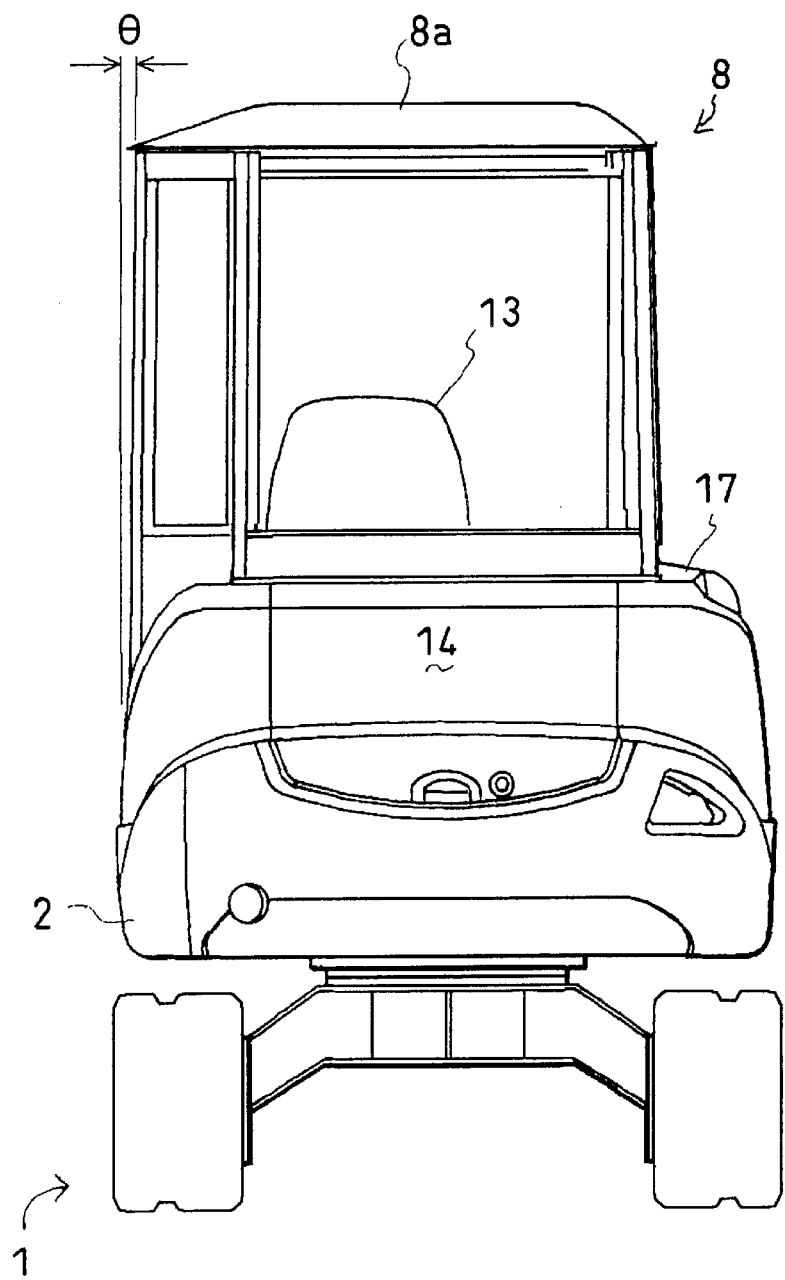
FIG. 2 is a rear view of the above.

In the case of a cabin 8 with the construction as shown in FIG. 2 or FIG. 3, the exposed portion of the tank cover 17 can be opened toward outer upper direction, thereby enabling a hydraulic oil tank, a fuel tank, etc. to be maintained from the outside. Moreover, the rear face of the bonnet 14 can also be opened rearward for maintaining.

Figure 4:
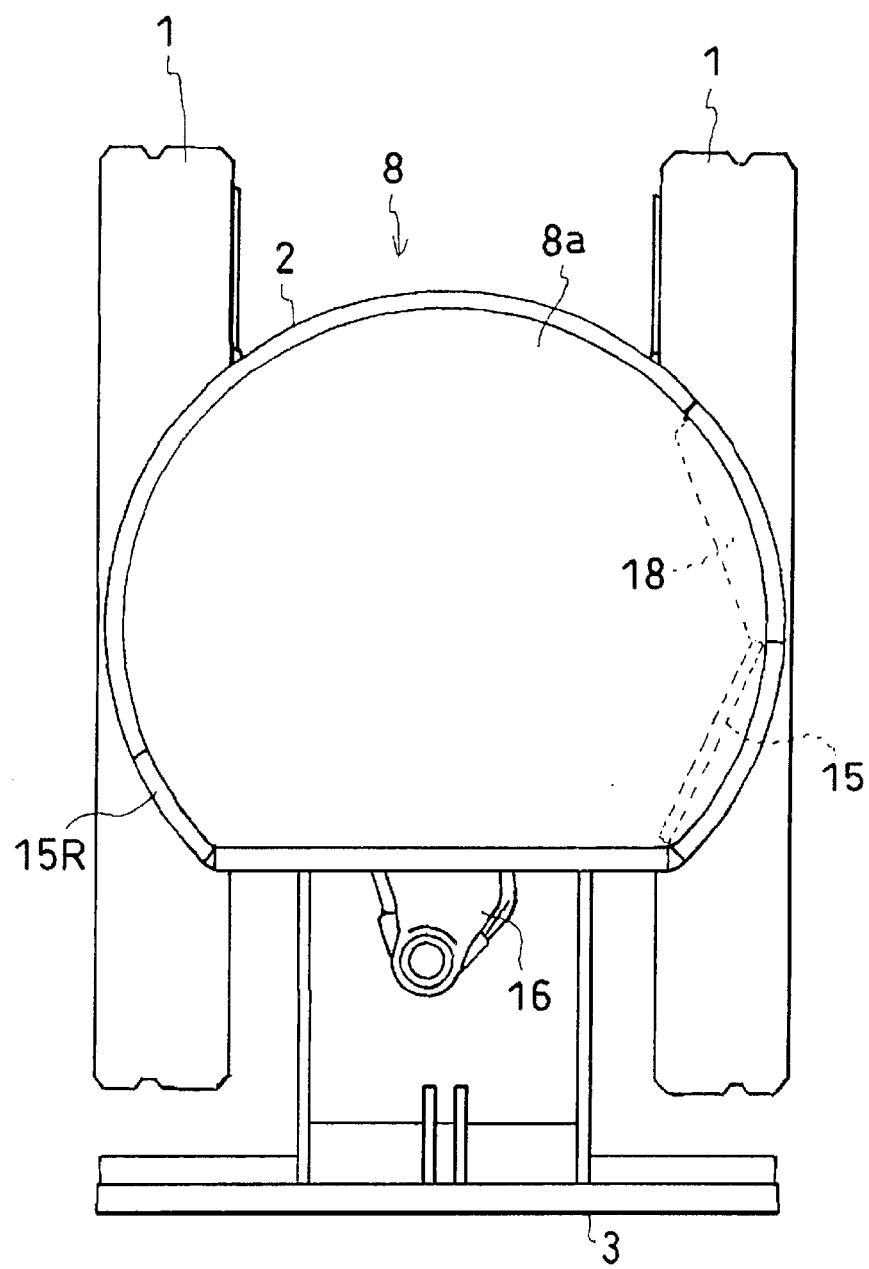
FIG. 4 is a plan view of a backhoe adopting a cabin according to another embodiment of the present invention.

On the other hand, as shown in FIG. 4, in the case of a cabin 8 with the construction that the cabin 8 covers the whole surface of the turn frame 2, the right side surface of the cabin 8 is mounted on the outer peripheral face of the tank cover 17. In this construction, a door is provided not only in left side but also in right side in traveling direction so as to serve as a door 15R. The tank cover 17 is constructed so as to be opened to turn freely in a horizontal direction, or be opened inside the cabin 8.

Each of the front surface of the cabin 8, the left side door 15, and the right side surface of the cabin 8 are constituted by a plane which is covered by glass (window glass) excluding a portion thereof serving as a roof, a part of side surface, or a support frame, so as to provide a visual range of an operator at work as wide as possible.

Moreover, the cabin 8 covers the top of the turn frame 2 as widely as possible and enlarges the indoor space, thereby improving comfort and operability.

Toward the left in the traveling direction in the cabin 8 are disposed the operator's seat 13 and operating levers, etc. The right side from back lower part of the operator's seat 13 is covered by the bonnet 14, thereby serving as the engine room. As shown in FIG. 1, the rear portion of the cabin 8 is mounted in a state of protruding a little rearward from the top rear portion of the bonnet 14, thereby assuring the indoor space widely. Moreover, the rear portion of the cabin 8 is constructed so as not to protrude outward from turn motion area of the turn frame 2, and it is avoided that the rear portion of the cabin 8 hits against obstacles at turn motion.

The outer peripheral end of the front surface, the rear surface, and the side surface of the cabin 8 are disposed inside the outer peripheral end of the turn frame 2. And, as shown FIG. 2, the side surface of the cabin 8 excluding the front side surface is not perpendicular to the ground surface, but the upper portion thereof is slanted at an angle toward the center of the machine body. If the slope angle is too large, the indoor space will become small both to arise an oppressive sensation and to worsen operability. On the other hand, if the slope angle is zero degree, the appearance of the cabin 8 is not good because of its large and unstable look in the upper portion of the cabin 8. Furthermore, at turn motion in a narrow field, since a backhoe also becomes an slant attitude according to the sloping ground, possibility of the upper portion of a cabin 8 hitting obstacles of a high location and being damaged increases.

Therefore, in the present embodiment, the slope angle is about 1 degree, so the workability in the narrow field is improved, and an appearance with the sense of stability which evokes a smart impression is brought to the backhoe.

Figure 5:
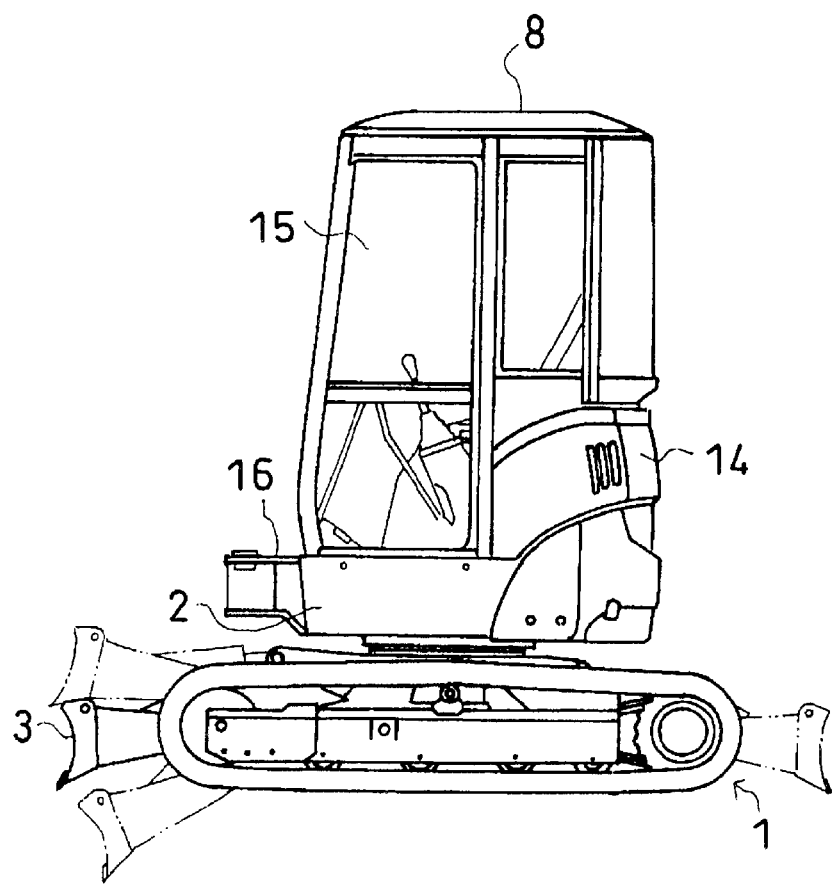
FIG. 5 is a side view of the above.
Figure 6:
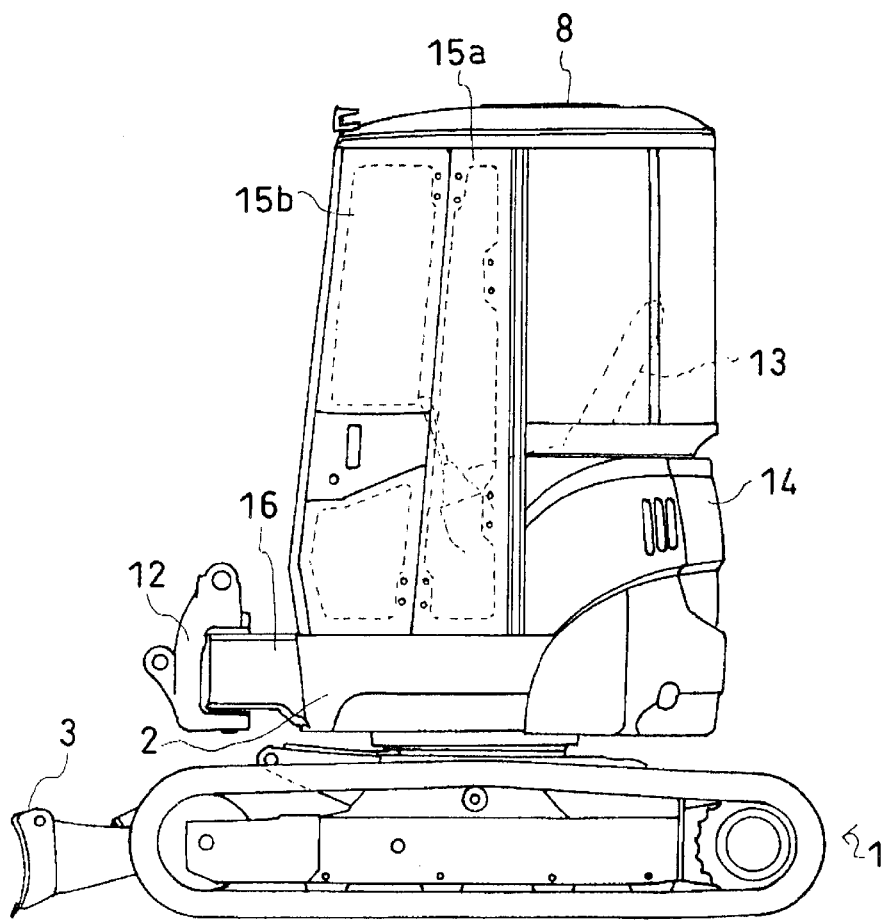
FIG. 6 is a side view of another embodiment according to the present invention.

Furthermore, on the turn frame 2, whether the cabin 8 exposes a part of the tank cover 17 as shown in FIG. 3 or the cabin 8 covers the whole surface of the tank cover 17 as shown in FIG. 4, a rear-door 15a and a front-door 15b may be substantially the same in size as shown in FIG. 1 and FIG. 3, or the front-door 15b may be larger than the rear-door 15a as shown in FIG. 6, or the door 15 may be constituted by a single door as shown in FIG. 5. That is, the door 15 of one sheet type shown in FIG. 5 is adopted in the embodiment shown in FIG. 4, where the foldable type instead of one sheet type may be adopted as the door 15.

Figure 8:
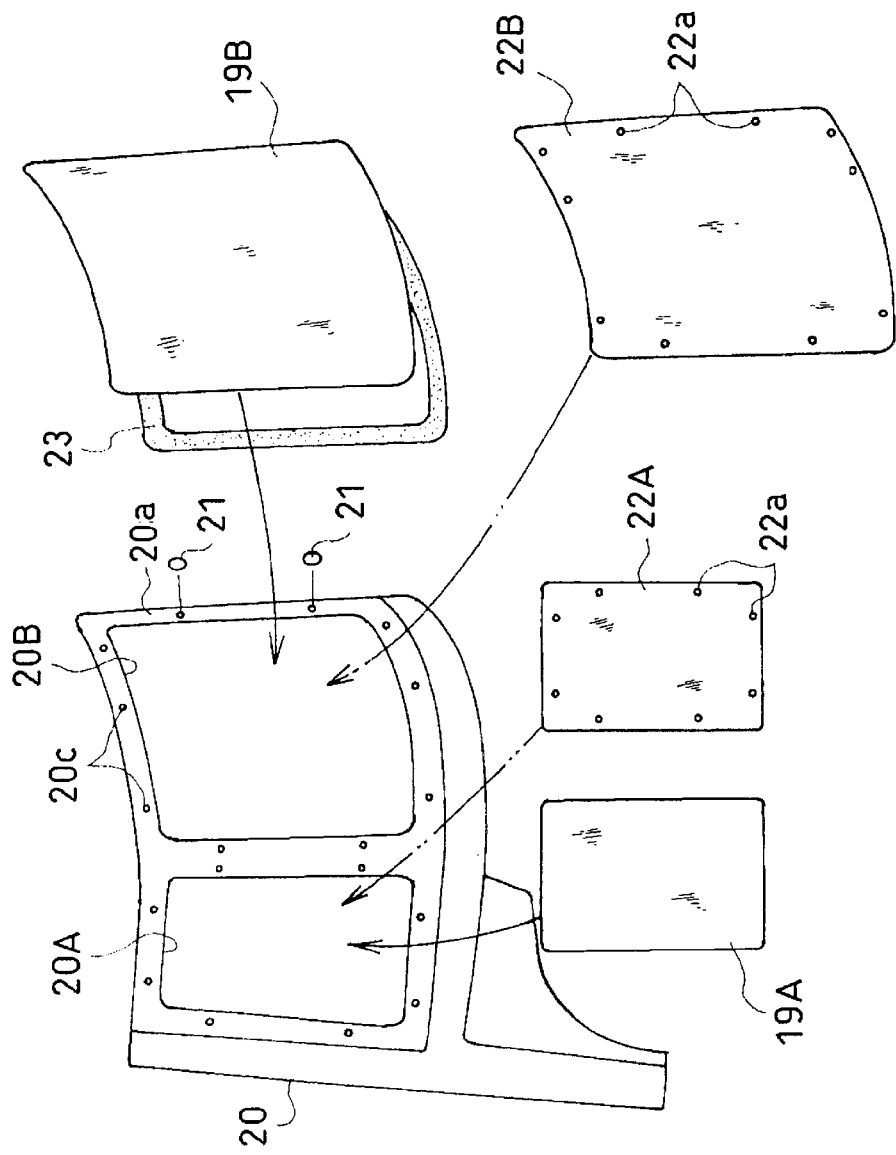
FIG. 8 is a perspective view of glasses during their attachment.

Next, description will be given of the construction for assuring the wide visual range in addition to the door 15 by installing glass (window glass) 19 in a cabin frame 20 constituting the cabin 8, in accordance with FIG. 8.

In the cabin frame 20 are provided many openings 20A, 20B . . . , around which fixing edges 20a for installing glasses 19A, 19B . . . respectively are formed. The following is description for one of fixing edges 20a.

The holes (or bosses) 20c, 20c . . . are provided at proper intervals in the fixing edges 20a. Seals 21, 21 . . . are stuck on the holes 20c, 20c. . . and close the holes 20c, 20c . . . An adhesive bond is applied to the seals 21, 21 . . . and the fixing edges 20a, to which glasses 19A, 19B . . . adhere through respective sealing members 23. The seals 21 cover the holes 20c so as to prevent the adhesive bond from entering into and plugging up the holes 20c or burying screw threads therein, thereby enabling a later-mentioned substitute part 22 to be installed in the cabin frame 20. In the hole 20c, a screw thread (tap) is formed or a boss is embedded.

The substitute part 22 can be installed in the cabin frame 20 in case that the window glass 19A should be damaged at work or traveling etc. The substitute part 22 is constructed by a part which is comparatively easy to be obtained, for example, a transparent acrylic board etc. Around the respective substitute members 22a, 22B . . . are opened holes 22a, 22a . . . corresponding to the location of the holes 20c, 20c . . .

In this construction, when installing the substitute part 22, damaged glasses are removed, and the seals 21, 21 . . . in the installation portion are also removed, and then, the substitute part 22 is fixed by inserting a screw or a bolt between the hole 20c and the hole 22a. When providing bosses instead of the holes 20c, the substitute part 22 may be fixed by a pin etc.

Thus, when preparing the substitute parts 22 made of comparatively cheap and light synthetic resin etc. beforehand, it is not necessary to wait until genuine parts arrive, even if glasses are damaged, and repairs can be done simply and cheaply by installing the substitute part for interchange. Moreover, since the substitute part can be easily installed by the screw stop etc., it is not necessary to be contact with a service center to call the expert of repair and to wait until the adhesive bond dries, it is possible to cope immediately and repair quickly to resume the work.

Next, the construction of a door 15 will be described.

As shown in FIG. 1, FIG. 3, etc., when regarding the side in which the excavating machine 7 is disposed as the front (traveling direction), the door 15 of the cabin 8 is disposed in the left side. The door 15 is divided into front and rear portions, and both portions are rotatably connected to each other by hinges 24, 24 . . . to fold the door 15 at the time of open.

Figure 7:
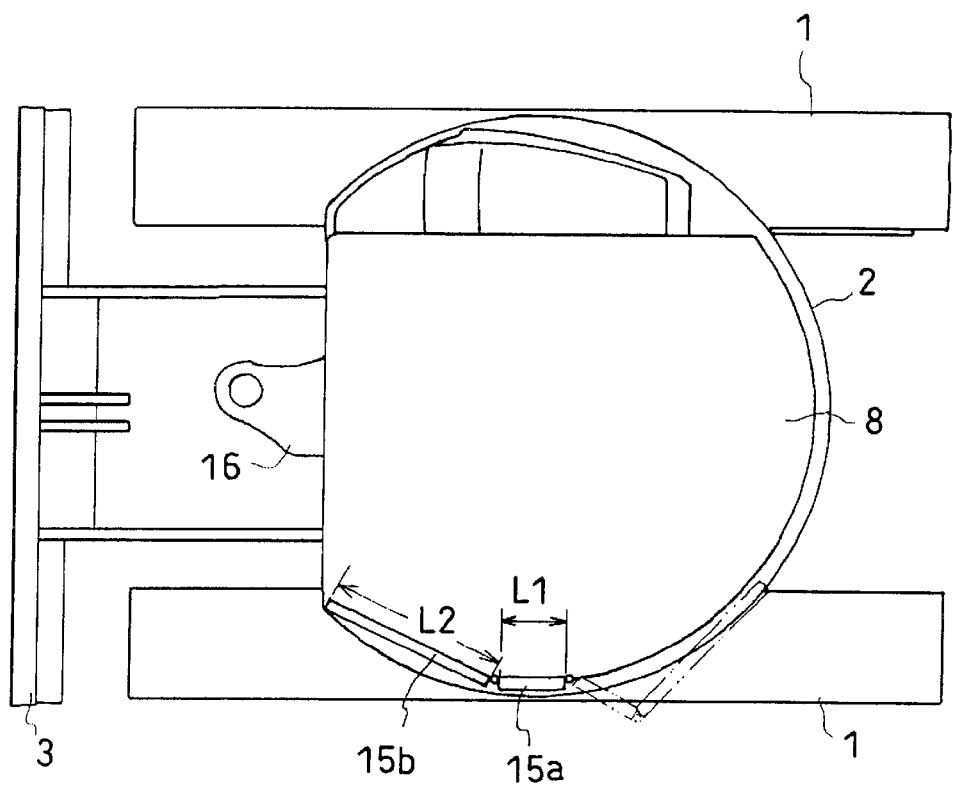
FIG. 7 is a plan view of the above.

The door shown in FIG. 6 and FIG. 7 is constructed so that a width L1 of the rear-door 15a may be smaller than a width L2 of front-door 15b having a knob 57 (L1<L2). However, in this constitution, the arc portion in the side of the operator's seat 13 is greatly deleted by the broad front-door 15b, so that the space is narrowed.

Therefore, in the embodiment shown in FIG. 1 and FIG. 3, the width L1 of the rear-door 15a and the width L2 of the front-door 15b are made equal (L1=L2). Thereby, the space deleted by the front and rear doors 15a, 15b in the arc portion in the side of the operator's seat 13 can be restricted to the minimum, so that the space in the side of the operator can be assured widely to improve comfort and operability.

The door 15 is constructed so as to be located along the rear side face of the cabin 8 at the time of opening the door 15 to about 180 degree. In the rear side face of the cabin 8, the hollow arcuate space 18 where the opened door 15 is settled is formed. When adopting the door 15 made of one sheet shown in FIG. 4 and FIG. 5, the hollow arcuate space 18 is formed similarly.

Thereby, the door 15 can be housed in the arcuate space 18 without protruding from the radius R of the turn frame 2 even at the time of opening the door 15 fully, so that the backhoe can turn without caring about the door 15 by preventing near obstacles etc. from hitting to damage the door 15 at the turn motion with the door 15 opened. Although illustration is omitted, a catch for fixing the door 15 in the state of full open is provided in the side of the cabin 8.

In addition, it goes without saying that the door 15 is constructed so as to fall within the radius R of the turn frame 2 even at the time of closing the door 15.

Figure 21:
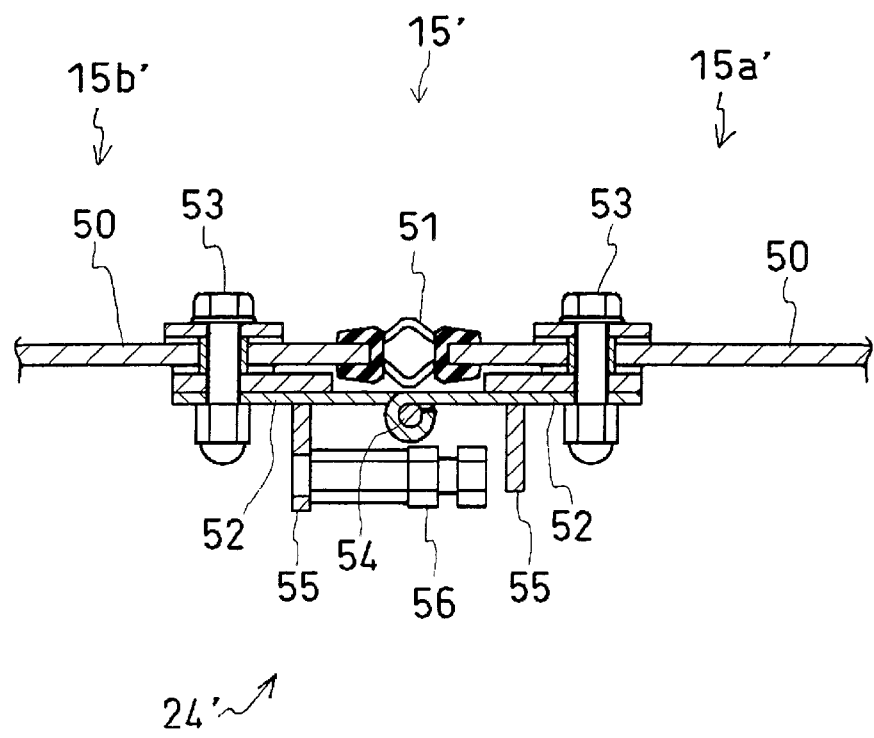
FIG. 21 and FIG. 22 are sectional views of conventional door hinges.

The hinges are provided between the rear-door 15a and the front-door 15b of the foldable door 15. A conventional construction about connection between door glasses 50, 50 is shown in FIG. 21. A sealing elastic member 51 made of rubber etc. is interposed between end faces of door glasses 50, 50. In a hinge 24', hinge plates 52, 52 are fixed to the respective door glasses 50, 50 with bolts 53, 53 . . . and pivotally connected to each other through a pivotal shaft 54. Stays 55, 55 protrude in the inner direction from the inside surfaces of the respective hinge plates 52, 52. One stay 55a is fixedly provided with a stopper 56, and the other stay 55a serves as a plate contacting the stopper 56.

When opening the door 15' of such a construction, the hinge 24' moves in the outward direction so as to bend a rear-door 15a' and a front-door 15b' in the inward direction. However, in the construction as shown in FIG. 21, since the pivotal shaft 54 is not located on a joined extension line serving as respective middle lines of door glasses 50, 50 in their thickness, the elastic member 51 has large bending, large expansion and contraction repeated whenever the door 15' is opened and closed. Therefore, the life of the elastic member 51 is shortened.

Figure 22:
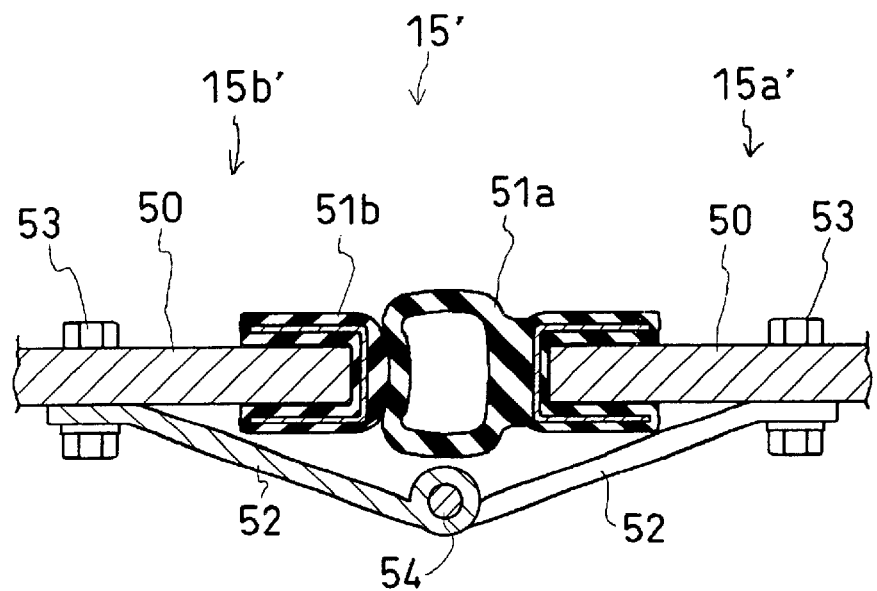

Alternatively, in another conventional hinge construction shown in FIG. 22, the elastic member 51 is divided into right and left parts. One elastic member 51a contacts the other elastic member 51b so as not to make a space even at the time of opening and closing the door 15'. However, in the construction as shown in FIG. 22, when the elastic member 51 degrades or dust etc. enter the contact portion between the members 51a and 51b, there is made a space causing rainwater leaks etc.

Moreover, in both the constructions shown in FIGS. 21 and 22, when the door 15' is opened fully, the hinge 24' which has been located inside at the time of close comes to protrude greatly in the outward direction. As the case may be, the hinge 24' protrudes from the radius R of the turn frame 2 so as to be damaged by hitting of obstacles at the turn motion. At the time of the door 15' closed, divided door 15a' and 15b' are unfolded so as to greatly reduce the arcuate space similarly to the door made of a single sheet, whereby the indoor space becomes small.

The present invention adopts the following hinge structure in view of the above reason.

Figure 10:
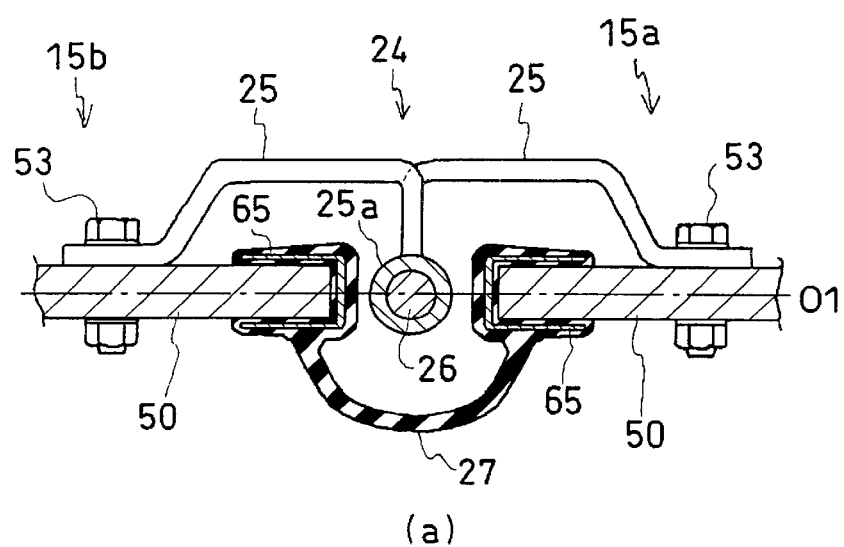
Figure 10:
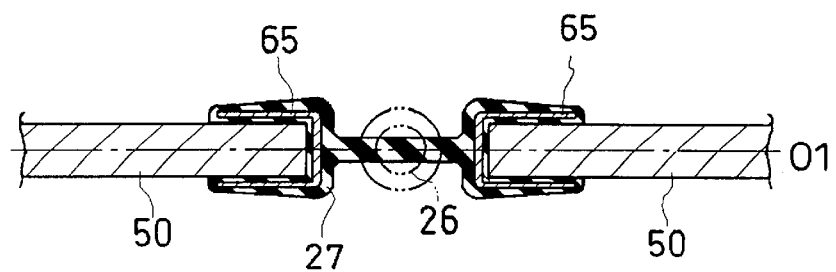

In a first embodiment shown in FIG. 10 (a), a hinge plate 25 of the hinge 24 is constructed in the shape of a ladle in plan view, and a boss portion 25a for inserting a pivotal shaft 26 is formed at the tip of the hinge plate 25, and the other ends of the hinge plate 25 are fixed to inside edges of door glasses 50, 50 with bolts 53. The center of the boss portion 25a is located on a middle line 01 serving as a joined extension line of both middle lines of the door glasses 50 in their thickness so that the distance between door glasses 50, 50 may not change at the time of folding.

Edge portions of door glasses 50, 50 are connected to each other through a sealing member 27 constituted by an elastic member made of rubber etc. The sealing member 27 consists of portions which fit into the respective edges of the door glass 50, 50, and a portion which bypasses the boss portion 25a and connects the portions fitting into the edges of door glasses 50, 50 to each other.

Moreover, in location excluding the hinged part 24, the sealing member 27 is linearly connected along the middle line 01, as shown in FIG. 10 (b).

Figure 9:
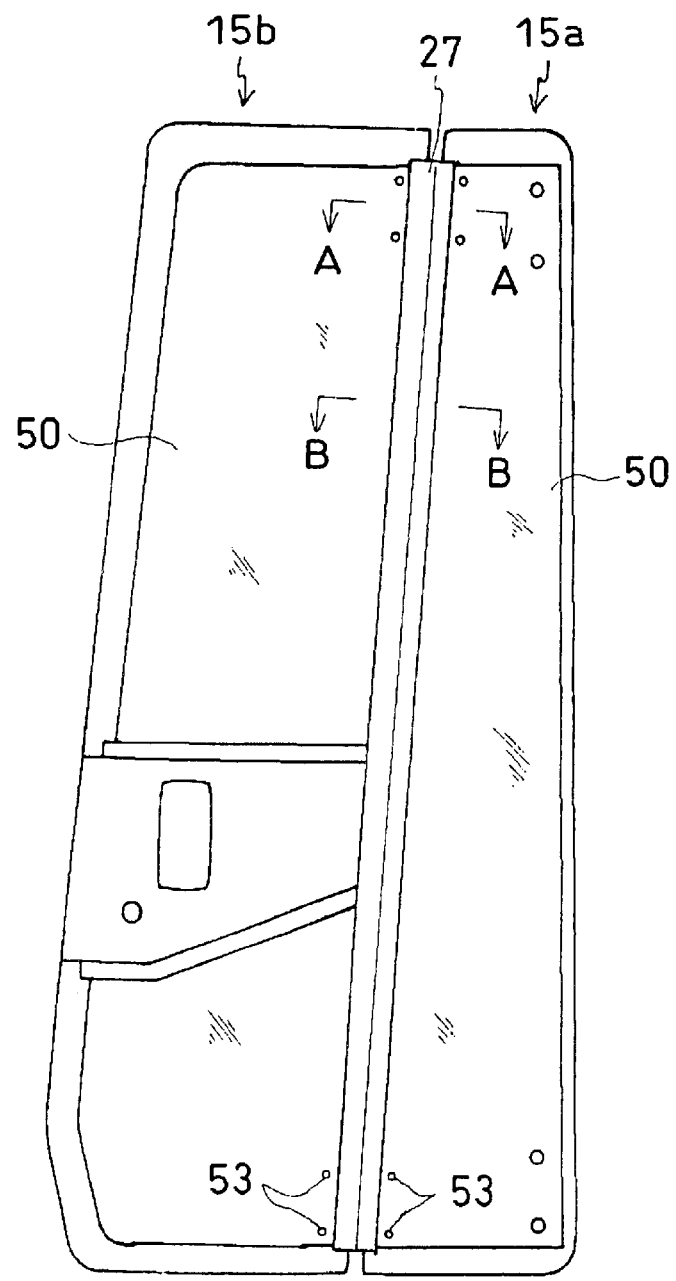
FIG. 9 is a side view of a door.

Thus, the side face appearance of the hinged part 24 constructed as mentioned above is as shown in FIG. 9. By the above construction of seals and hinges, when the door is folded and unfolded for opening and closing, strong tension or compressive force hardly interacts on the sealing member 27. Thereby, the sealing member 27 can have a long life without degrading easily.

Moreover, in the sealing member 27, the portion in which edges of door glasses 50, 50 are inserted is reinforced by disposing a U-like shaped core metal 65 in plan view, so that the sealing member 27 can be attached without an adhesive bond by the merely easy inserting work.

Figure 11:
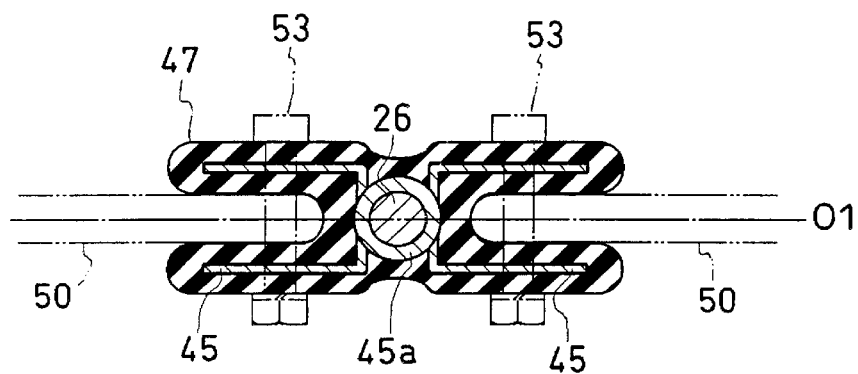
FIG. 11 is a sectional plan view of a hinged part according to a second embodiment.

In the second embodiment shown in FIG. 11, the hinge plates 25 and the sealing member 27 are constructed integrally. That is, each of hinge plates 45 is formed in a U-like shape in plan view, and a boss portion 45a is provided on the middle of the closed end of the hinge plate 45. A sealing member 47 covers outer surfaces of the hinge plates 45 with the boss portions 45a. Door glasses 50, 50 are inserted in the respective open ends of the hinge plate 45 and fixed to the hinge plate 45 by bolts 53, 53. Also in the case of the present embodiment, the center of the boss portion 45a is located on the middle line 01 serving as joined extension line of middle lines of both door glasses 50, 50 in their thickness.

In addition, the bolt 53 may be unnecessary by applying the adhesive bond between the hinge plate 45 and the door glass 50 so as to adhere the hinge plate 45 to the door glass 50. Moreover, a sealing member containing the core part can be used instead of the hinge plates 45 and the sealing member 47.

Figure 12:
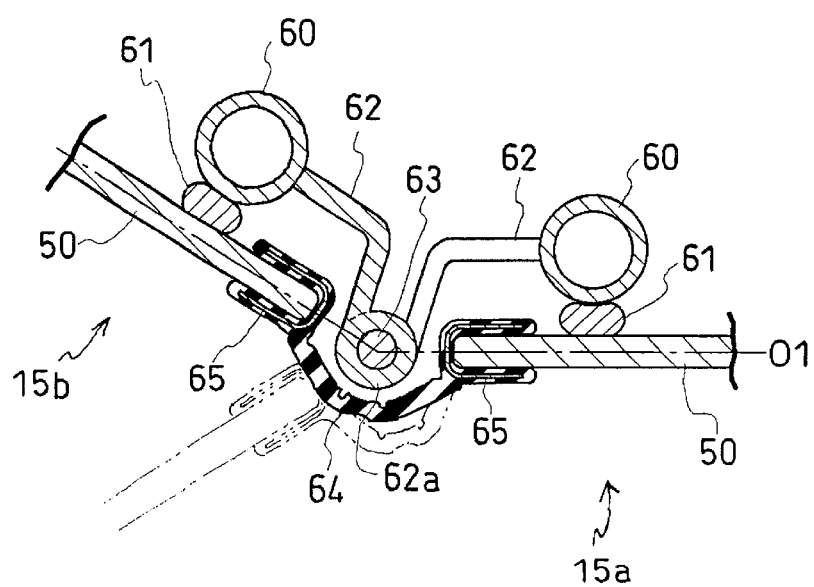
FIG. 12 is a sectional plan view of a hinged part according to a third embodiment.

In the third embodiment shown in FIG. 12, each of the door glasses 50 is adhered to each door frame 60 with the adhesive bond etc. through a sealing member 61, and a hinge plate 62 protrudes from each door frame 60. Each of the hinge plates 62 of the rear-door 15a and the front-door 15b is bent in a V-like shape, and at the tip of the hinge plate 62 is constructed a boss portion 62a, which is supported pivotally by a pivotal shaft 63. The center of the pivotal shaft 63 is located on the middle line 01 serving as a joined extension line of middle lines of the door glasses 50, 50 in their thickness.

Between the edges of both door glasses 50, 50 is interposed a sealing member 64, and portions of the sealing member 64 attached to the respective door glasses 50 is constructed in a U-like shape and has a core metal 65 built-in integrally.

Figure 13:
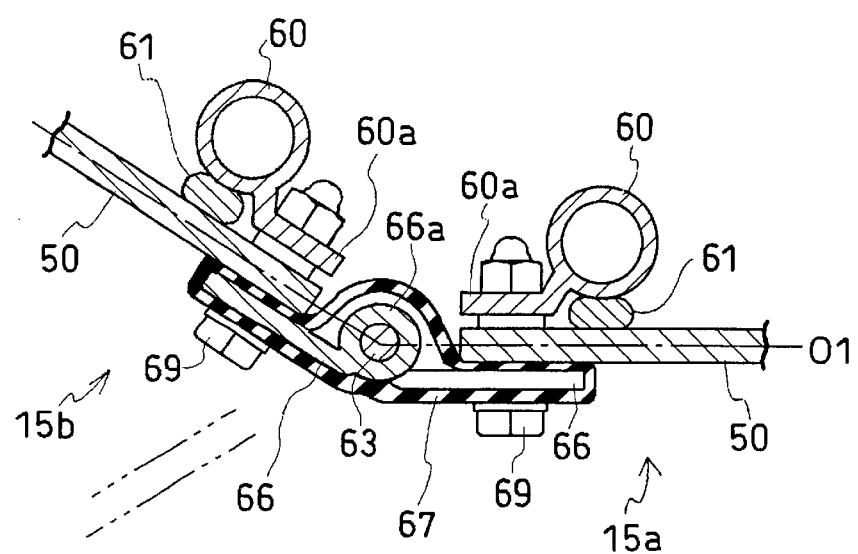
FIG. 13 is a sectional plan view of a hinged part according to a fourth embodiment.

In the fourth embodiment shown in FIG. 13, from the door frame 60 is protruded a stay 60a. Each stay 60a, each door glass 50, each hinge plate 66, and a sealing member 67 are integrally fixed together with a bolt 69. The sealing member 67 is constructed so as to wrap the whole hinge plates 66. In the hinge plates 66, 66 are formed respective boss portions 66a, which are supported pivotally with a pivotal shaft 63. The center of the pivotal shaft 63 is located on the middle line 01 serving as a joined extension line of middle lines of the door glasses 50, 50 in their thickness.

Because the rotation center of the hinge 24 at a folded position agrees with the rotation center of the door glass 50 by constructions from the above-mentioned first embodiment to the fourth embodiment, the unreasonable force is not applied to the sealing member 27 at the time of opening and closing the door 15, and a life of the sealing member 27 can be lengthened. Additionally, in comparison with the conventional door which can be folded in only one side direction from its unfolded state at about 180 degrees, the present door can be folded in both side directions so as to assure the rotation angle range thereof widely.

A side end surface 8b of a roof 8a in the cabin 8 is constructed so as to protrude in the outward direction from the outer surface of the upper end of the door glass 50 and prevent rainwater from permeating.

Figure 15:
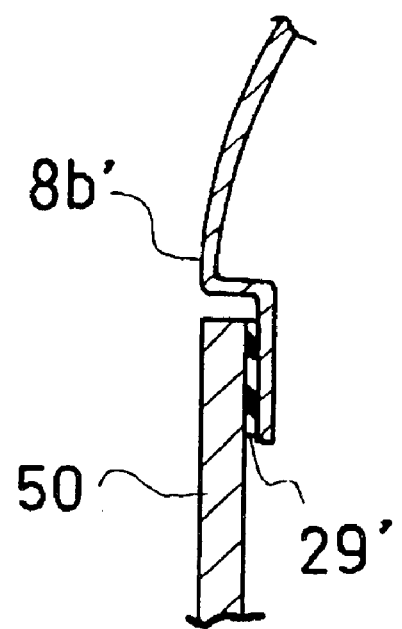
FIG. 15 is a conventional sectional view of the above.

Conventionally, the positional relation between the upper end of the door 15 and the cabin 8 is, as shown in FIG. 15, constructed so that a side end surface 8b' and an outer surface of the upper end of door glass 50 may coincide with each other so as to improve their appearance and expand the indoor space. A sealing member 29' is disposed in the gap between the side end surface 8b' and the door glass 50.

However, in the above construction, since a raindrop directly hits a portion of the sealing member 29' or collects on an upper portion of the sealing member 29', these portions will degrade early. Moreover, since the door 15 is opened and closed with rainwater adhered, the rainwater drips and flow in an indoor side.

Figure 14:
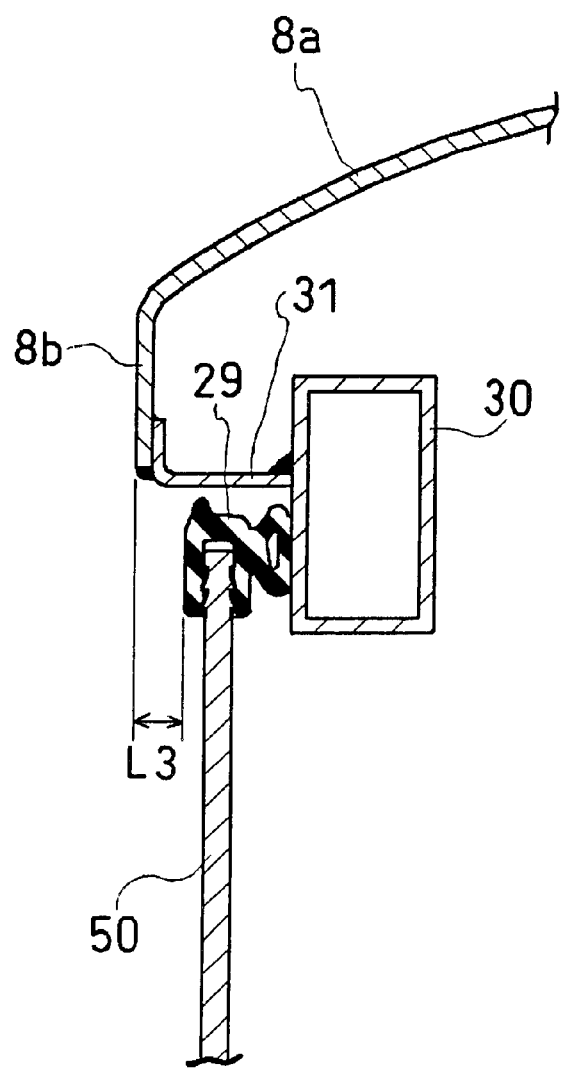
FIG. 14 is a sectional view of the top of the door showing its positional relation to a cabin roof.

Therefore, in the present invention, as shown in FIG. 14, to the outer side surface of a cabin frame 30 is fixed an overhang plate 31, which is protruded to the outer side in the horizontal direction and fixed to the side end surface 8b of the roof 8a. Alternatively, the roof 8a may be extended to the inner side in the horizontal direction and fixed to the cabin frame 30. Then, the sealing member 29 contacts the inner side of the cabin frame 30 or the overhang plate 31 by extending the seal 27 or adhering another sealing member 29 around the door 15. Thus, the side end surface 8b of a cabin 8 overhangs in the length of L3 outward from the outer surface of the sealing member 29 (or the door glass 50).

Due to such a construction, an overhang portion to the outer side in the side end surface 8b acts as "eaves" so that rain water may not hit the sealing member 29 directly, thereby mitigating the degradation of the sealing member 29 and preventing the invasion of rain water. Moreover, since the backhoe does not run at high speed, a wind noise etc. does not occur.

Figure 16:
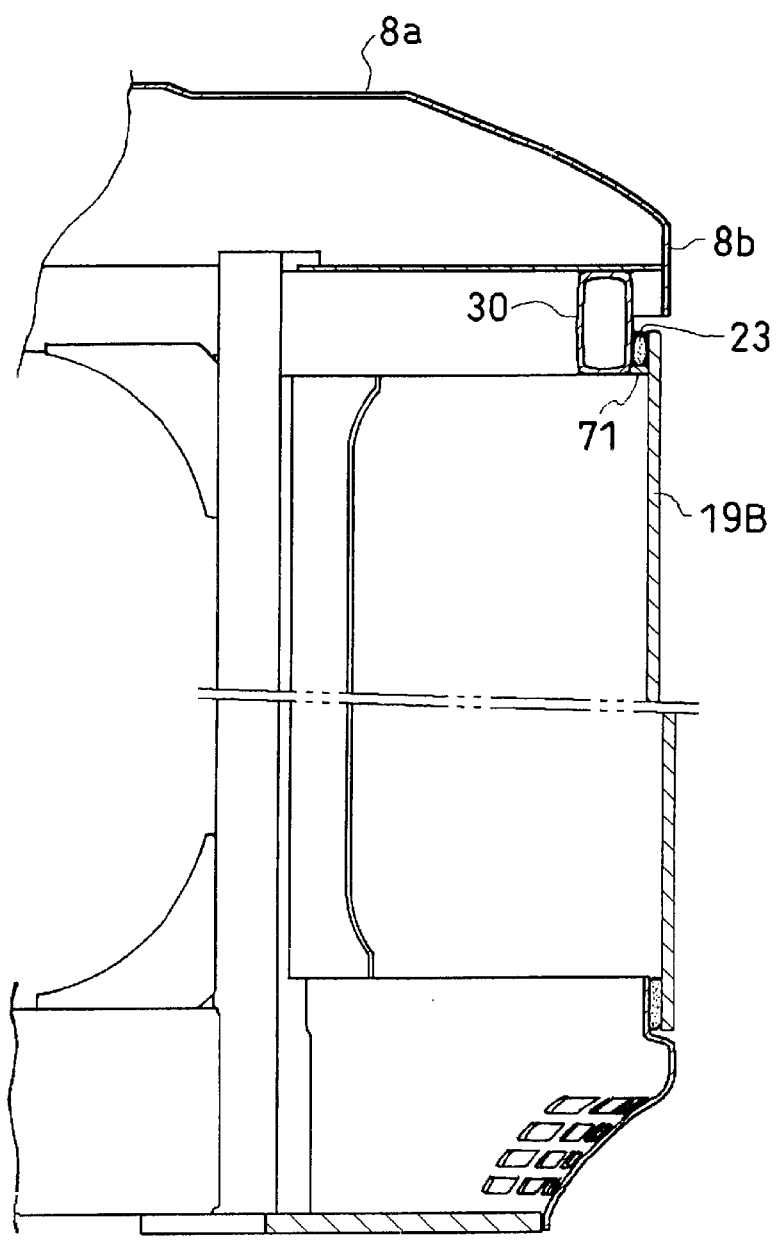
FIG. 16 is a sectional view of a rear glass and a cabin roof, showing a positional relation between them.

Furthermore, as shown in FIG. 16, also in the fixture of the side glass 19A or the rear glass 19B in the cabin 8, the side end surface 8b overhangs outward from the side glass 19A or the rear glass 19B. The sealing member 23 is adhered to the cabin frame 30 and glass with the adhesive bond. Under the sealing part 23, the plate 71 which acts as a dam is fixed to the cabin frame 30 so as to make the attachment of the sealing part 23 easily and prevent the adhesive bond from dripping.

A front glass is divided into an upper glass, which can be stored to upper side, and a removable lower glass 35, so that it can be opened to improve ventilation and visibility when working at hot time such as in summer and being hard to see a lower near side work position. Since the removed lower glass 35 putting in the cabin 8 has a possibility of falling or being kicked to break at movement, a storage space is formed under the fixture of the lower glass 35 so that the lower glass 35 may be stored and fixed with a beltlike member 36 of elastic material such as a rubber belt etc. according to the present invention.

Figure 17:
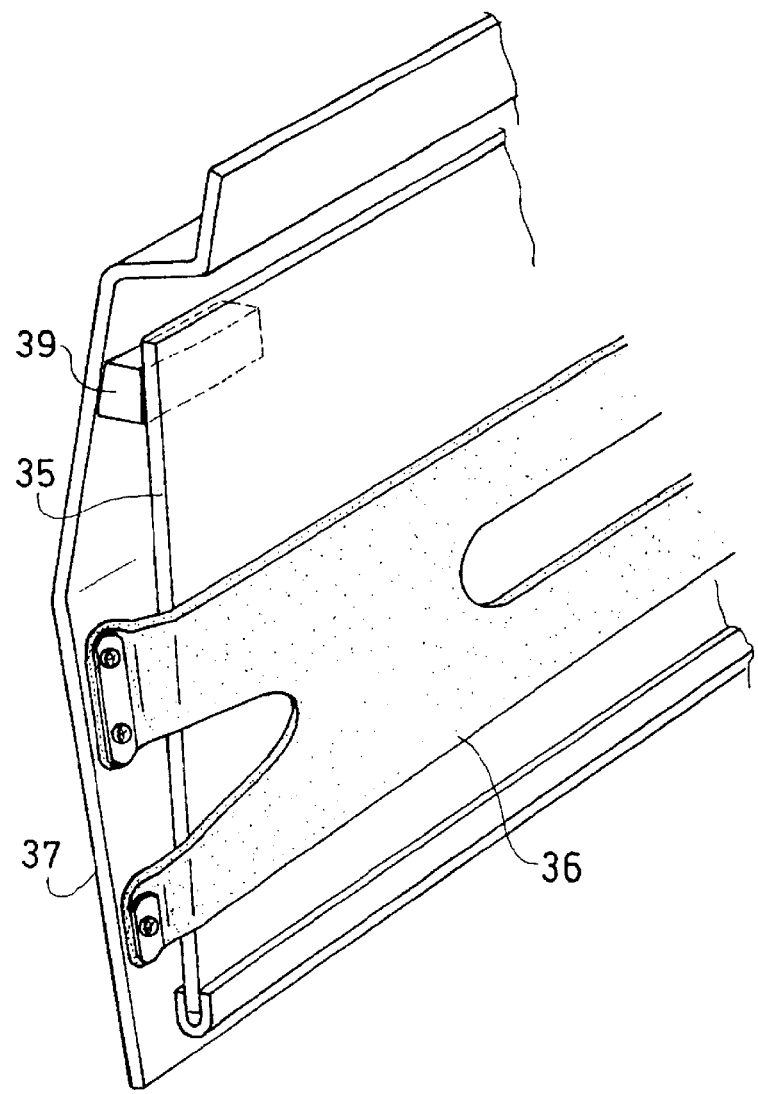
FIG. 17 is a partially perspective view of a front glass in storage.
Figure 18:
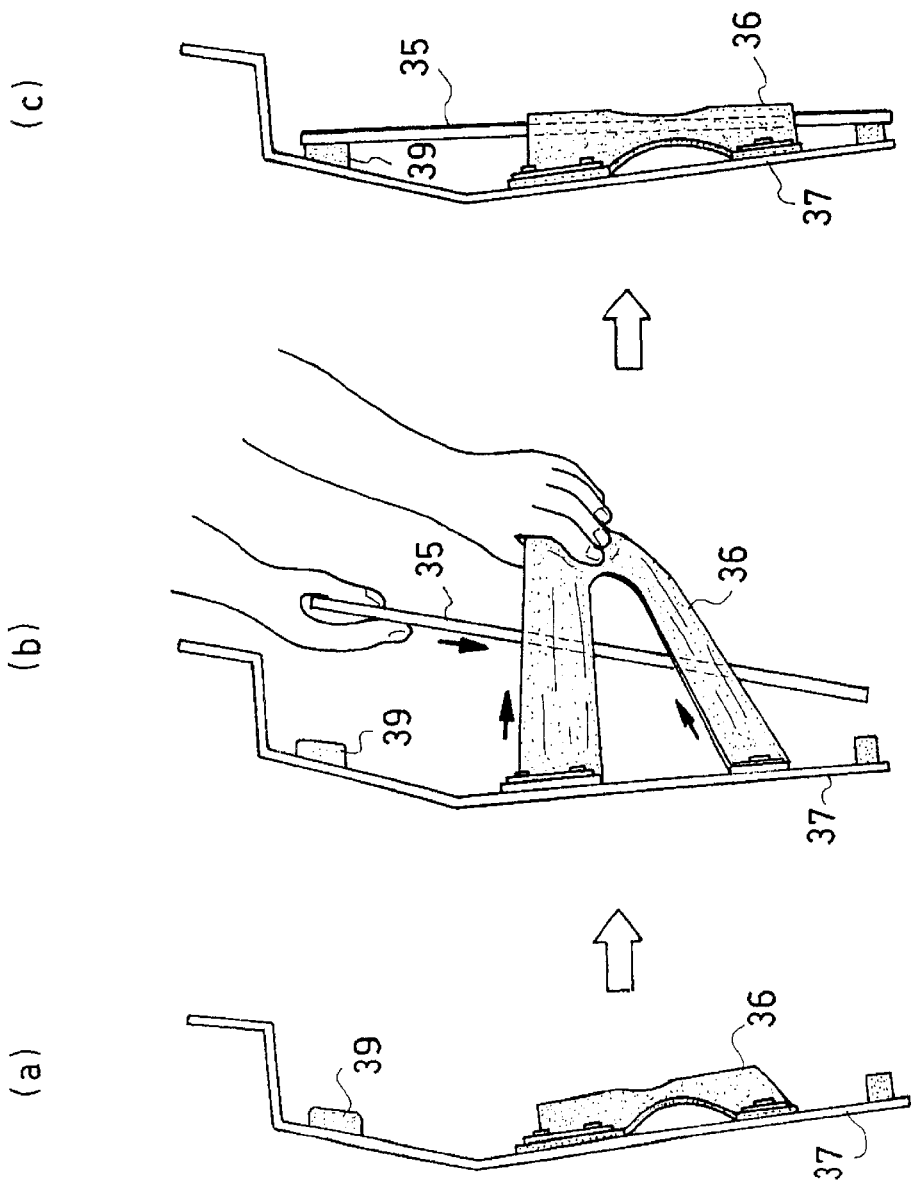
FIG. 18 is a side view of a front glass during its storage procedure.

That is, as shown in FIG. 17 and FIG. 18, the inner side portion of a front cover 37 of the cabin for supporting and installing the lower portion of the lower glass 35 is constructed in a concave which has the width for storing the lower glass 35. In the inner side surface of the front cover 37, shock absorbing materials 39 such as rubber are disposed at proper intervals so as to prevent the lower glass 35 from hitting the front cover 37 directly at the time of a storage. The both ends of the beltlike member 36 wider than the lower glass 35 are fixed to the both sides of inner side of the front cover 37.

Due to the construction, as shown in FIG. 18 (a) and FIG. 18 (b), the beltlike member 36 is pulled inward to form a space, into which the lower glass 35, that is removed and taken down in the inward direction, is inserted so as to be stored by the beltlike member 36. After the storage, as shown in FIG. 17 and FIG. 18 (c), the lower glass 35 is pulled to the side of the front cover 37 so as to be pushed and fixed to the shock absorbing materials 39 by the elastic force of the beltlike member 36.

Figure 19:
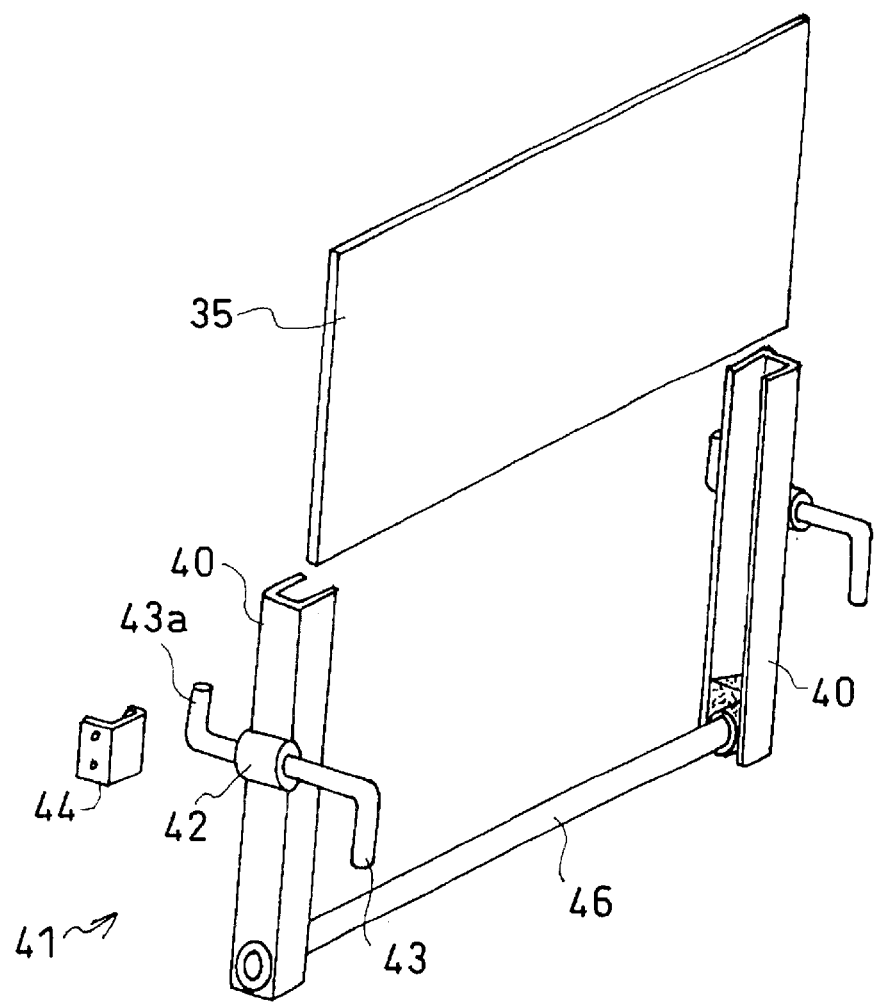
FIG. 19 is a perspective view of a constitution for storage of the front according to another embodiment.
Figure 20:
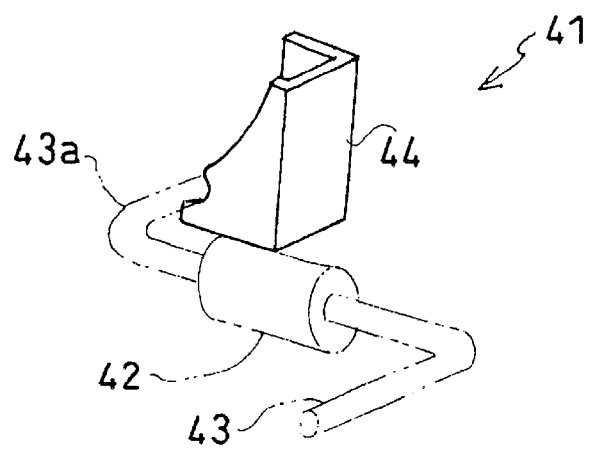
FIG. 20 is a perspective view of a locking part of the above.

Moreover, as shown in FIG. 19 or FIG. 20 about other embodiments to store and fix the lower glass 35, it may be so constructed that the lower glass 35 is inserted between right and left guide members 40, 40, each of which is constructed in the shape of a rail, and then the guide members 40 are fixed to the front cover 37. As shown in FIG. 19, each guide member 40 is constructed in a U-like rail shape in plan view, and the left and right guide body 40, 40 are connected to each other by the connecting shaft 46 in the position corresponding to the width of the lower glass 35, and pivotally supported by a floor portion or a lower portion of the front cover 37 so as to turn forward and backward integrally. A lock member 41 is disposed in the upper portion of the guide member 40 and constructed so as to lock the guide member 40 by being fixed at proper fastening portion provided in the front cover 37.

As one embodiment of the lock construction, a tube 42 is fixed to a upper portion of the guide member 40 in front and back horizontal direction. A cranked lock lever 43 is rotatably passed through the tube 42. A hook portion 43a is provided at the tip of the lock lever 43. A fastening member 44 is provided on the front cover 37 beside the hook portion 43a. By turning the lock lever 43, the hook portion 43a engages with the fastening member 44, thereby locking the guide member 40. Alternatively, a fastening hole may replace the fastening member 44, and the lock lever 43 may be biased by a spring so as to be maintained in a lock position.

POSSIBILITY OF INDUSTRIAL APPLICATION

As mentioned above, the cabin according to the present invention is useful to a rearward small-turn type backhoe, and suitable for such a construction that the cabin substantially falls with in the diameter of the turn circle even at the time of opening the door while assuring the maximum habitation space and operability in the limited turn table.

What is claimed is:

1. A cabin of a rearward small-turn backhoe, the backhoe including a turn frame whose portion excluding a working machine is formed substantially in circular shape and formed so that the diameter thereof is stored generally within the width of a traveling device, the cabin being enclosed by a front portion, a rear portion, and two side surfaces, said rear portion being formed into a curved surface shape disposed substantially along an outer peripheral shape of the turn frame in plan view, at least one of said side surfaces being formed in a polygonal shape.

2. The cabin of backhoe as set forth in claim 1, wherein the cabin covers a substantially whole side surface of the turn frame excluding the working machine mounting part and one side portion of a tank cover.

3. The cabin of backhoe as set forth in claim 1, wherein the cabin covers a substantially whole surface of the turn frame excluding the working machine mounting part.

4. The cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the cabin strides over a fuel tank mounted on one side of the turn frame so that a side surface of the fuel tank constitutes a part of side surface of the cabin.

5. The cabin of backhoe as set forth in claim 1, wherein the rear portion of the cabin is located on a rear outer peripheral end of an engine room.

6. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein an upper portion of the side surface of the cabin is slanted inward at turn motion.

7. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein an outer peripheral end of a roof in the cabin overhangs outward from an outer surface of a window glass.

8. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein, among side surfaces of the cabin, adjacent two surfaces arranged in a polygonal shape are constituted by a foldable door, and wherein the adjacent two surfaces have substantially equal width.

9. A cabin of a rearward-small turn backhoe, the backhoe including a turn frame whose portion excluding a working machine is formed substantially in circular shape and formed so that the diameter thereof is stored generally within the width of a traveling device, the cabin comprising:

a foldable door including a pair of door glasses and a hinge connecting the door glasses, wherein a center of a pivotal shaft of the hinge is located on a joined extension line serving as middle lines in thickness of both the door glasses.

10. The cabin of backhoe as set forth in claim 9, wherein edge portions of both the door glasses connected to each other by the hinge are also connected to each other by a sealing member bypassing the hinge.

11. A cabin of a backhoe, comprising:

a cabin frame; and a fixing edge of the cabin frame provided therein for installing a glass, said fixing edge surrounding the glass; and having holes or bosses for installing a replacement of the glass.

12. A cabin of a backhoe, comprising:

a front lower glass enabled to be detached and attached; and a beltlike member wider than the width of the front lower glass stretched in horizontal direction, wherein the removed front lower glass is stored between an inner surface of the cabin and the beltlike member.

13. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the cabin covers a substantially whole side surface of the turn frame excluding the working machine mounting part and one side portion of a tank cover, and an upper portion of the side surface of the cabin is slanted inward at turn motion.

14. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the cabin covers a substantially whole surface of the turn frame excluding the working machine mounting part, and an upper portion of the side surface of the cabin is slanted inward at turn motion.

15. The cabin of backhoe as set forth in claim 4, wherein an peripheral end of a roof in the cabin overhangs outward from an outer surface of a window glass.

16. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the rear portion of the cabin is located on a rear outer peripheral end of an engine room and an upper port ion of the side surface of the cabin is slanted inward at turn motion.

17. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially alone an outer peripheral shape of the turn frame in plan view, and at least one side surface formed in a polygonal shape, wherein the cabin covers a substantially whole side surface of the turn frame excluding the working machine mounting part and one side portion of a tank cover, and an peripheral end of a roof in the cabin overhangs outward from an outer surface of a window glass.

18. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the cabin covers a substantially whole surface of the turn frame excluding the working machine mounting part, and an peripheral end of a roof in the cabin overhangs outward from an outer surface of a window glass.

19. The cabin of backhoe as set forth in claim 4, wherein an peripheral end of a roof in the cabin overhangs outward from an outer surface of a window glass.

20. A cabin of a rearward small-turn backhoe, the backhoe including a turn frame whose portion excluding a working machine is formed substantially in circular shape and formed so that the diameter thereof is stored generally within the width of a traveling device, the cabin comprising a rear portion formed into a curved surface shape disposed substantially along an outer peripheral shape of the turn frame in plan view, and at least one side surface formed in a polygonal shape, wherein the rear portion of the cabin is located on a rear outer peripheral end of an engine room and an peripheral end of a roof in the cabin overhangs outward from an outer surface of a window glass.

\* \* \* \* \*